United States Patent
Dey et al.

(10) Patent No.: US 6,849,339 B2
(45) Date of Patent: Feb. 1, 2005

(54) COMPOSITE LAMINATE STRUCTURES ESPECIALLY USEFUL FOR AUTOMOTIVE TRIM COMPONENTS, AND METHODS AND TIE LAYERS EMPLOYED TO MAKE THE SAME

(75) Inventors: Subir K. Dey, Bridgewater, NJ (US); Subhash H. Patel, Piscataway, NJ (US)

(73) Assignee: Guardian Industries Corporation, Auburn Hills, MI (US)

( * ) Notice: Subject to any disclaimer, the term of this patent is extended or adjusted under 35 U.S.C. 154(b) by 201 days.

(21) Appl. No.: 09/993,908

(22) Filed: Nov. 27, 2001

(65) Prior Publication Data

US 2003/0099789 A1 May 29, 2003

(51) Int. Cl.[7] .................... B32B 27/08; B32B 27/18; B32B 27/28; B32B 27/32
(52) U.S. Cl. ............ 428/421; 428/422; 428/515; 428/516; 428/520; 428/522; 428/523; 525/92 A; 525/95; 525/216
(58) Field of Search ............... 428/421, 422, 428/515, 516, 517, 520, 522, 523; 525/92 A, 95, 98, 99, 216

(56) References Cited

U.S. PATENT DOCUMENTS

| | | | | |
|---|---|---|---|---|
| 4,259,220 A | * | 3/1981 | Bunnelle et al. | 525/98 |
| 4,332,858 A | * | 6/1982 | Saitoh et al. | 428/412 |
| 4,996,086 A | * | 2/1991 | Gerlowski et al. | 427/421 |
| 5,284,693 A | * | 2/1994 | Spain et al. | 428/172 |
| 5,369,180 A | * | 11/1994 | Machado et al. | 525/185 |
| 5,403,658 A | * | 4/1995 | Southwick et al. | 428/355 BL |
| 5,883,188 A | * | 3/1999 | Hwang et al. | 525/71 |
| 6,187,233 B1 | | 2/2001 | Smith | |
| 6,291,583 B1 | * | 9/2001 | Komatsuzaki et al. | 525/95 |
| 6,306,503 B1 | | 10/2001 | Tsai | 428/412 |
| 6,582,829 B1 | * | 6/2003 | Quinn et al. | 428/513 |
| 6,657,006 B2 | * | 12/2003 | Beuzelin et al. | 525/71 |
| 2002/0009598 A1 | | 1/2002 | LaFave et al. | 428/421 |
| 2003/0099790 A1 | * | 5/2003 | Dey et al. | 428/31 |

FOREIGN PATENT DOCUMENTS

| | | | | |
|---|---|---|---|---|
| EP | 0 100 912 | * | 2/1984 | |
| EP | 0 451 920 | * | 10/1991 | |
| EP | 0 864 417 A2 | | 9/1998 | B32B/27/32 |
| EP | 0 864 417 A3 | | 9/1998 | B32B/27/32 |
| WO | 91/00178 | | 1/1991 | |
| WO | 99/33649 | | 7/1999 | |
| WO | WO 00/30849 | * | 6/2000 | |

* cited by examiner

Primary Examiner—Vivian Chen
(74) Attorney, Agent, or Firm—Nixon & Vanderhye P.C.

(57) ABSTRACT

Laminates include a thermoplastic substrate layer, a clear coat layer, and a tie layer. The tie layer most preferably includes an adhesive-enhancing effective amount of a branched or linear styrenic block copolymer which adhesively bonds the substrate and clear coat layers one to another. Advantageously, the tie layer includes a blend of the styrenic block copolymer and a tackifier resin, preferably a terpene resin. The laminate may be employed to manufacture a variety of shaped articles, most preferably automotive trim components.

10 Claims, 1 Drawing Sheet

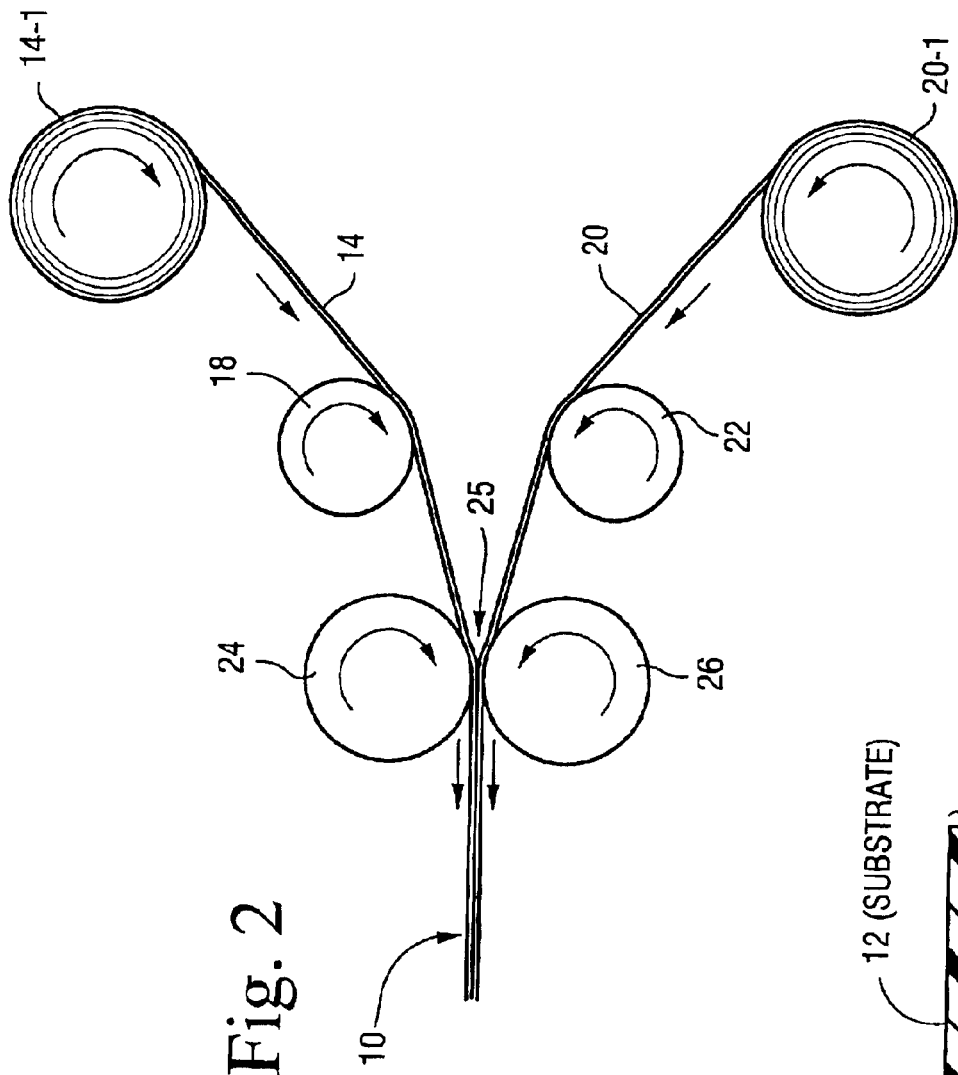
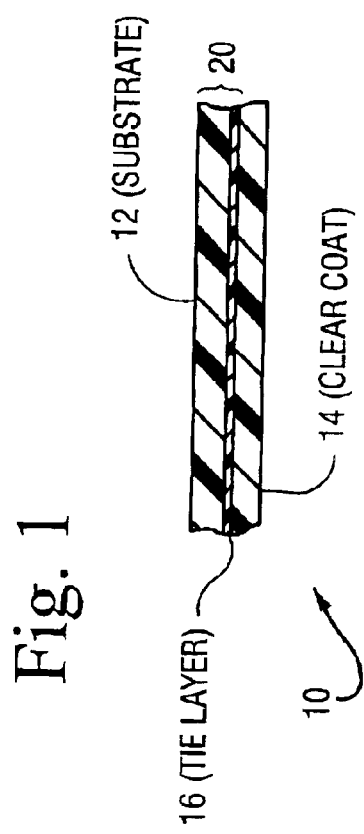

COMPOSITE LAMINATE STRUCTURES ESPECIALLY USEFUL FOR AUTOMOTIVE TRIM COMPONENTS, AND METHODS AND TIE LAYERS EMPLOYED TO MAKE THE SAME

FIELD OF THE INVENTION

The present invention related generally to tie layers that may be employed to adhesively bond plastic film layers and/or sheets one to another to form composite laminate structures. More specifically, the present invention relates to composite laminate structures that are particularly usefully employed in the manufacture of automotive components (especially exterior automotive trim components).

BACKGROUND AND SUMMARY OF THE INVENTION

It is notoriously well known to apply automotive trim components made of plastics material to the exterior of automotive vehicles, such as cars, trucks, vans and the like. Examples of such trim components include accent stripes, side door bumper elements, claddings, wheel covers, grills, and bumper fascia. Moreover, other automotive components that are made from plastics, such as automotive body panels (e.g., door side panels) and the like are known.

Problems have been encountered in the past when the color of automotive components formed from plastics materials is attempted to be matched or coordinated with the overall body color. For example, such components have typically been painted with a final "clear coat" being applied for purpose of protecting the underlying colored or pigmented paint coat.

It has recently been proposed in U.S. Pat. No. 6,187,233 B1 issued on Feb. 13, 2001 (the entire content of which is expressly incorporated hereinto by reference), to provide a color pigmented thermoplastic layer which is calendered into a laminate structure with a transparent clear coat layer. The laminate is then subsequently vacuum-formed into a three dimensional shaped structure approximating the final shape of the final automotive component. In especially preferred embodiments, the color pigmented layer is a thermoplastic polyolefin (TPO), while the clear coat layer is a fluorinated thermoplastic material, such as polyvinyl fluoride (PVF).

While the techniques described in the above-noted U.S. Pat. No. '233 patent are satisfactory, certain improvements therein are still desirable. For example, it would be highly desirable if the bonding strength between the color pigmented and clear coat layers could be enhanced. It is towards providing such improvements that the present invention is directed.

Broadly, the present invention is embodied in laminates which include a thermoplastic substrate layer, a clear coat layer, and a tie layer. The tie layer most preferably includes an adhesive-enhancing effective amount of a styrenic block copolymer which adhesively bonds the substrate and clear coat layers one to another. Most preferably, the tie layer is a block copolymer comprised of styrene units and lower olefinic (e.g., C2–C5) copolymeric units, such as ethylene-propylene units, ethylene-butylene-isoprene units and the like. In especially preferred embodiments of the invention, the tie layer is a blend of the styrenic block copolymer and a tackifier (e.g., a terpene resin). The laminate may be employed to manufacture a variety of shaped articles, most preferably automotive trim components.

These and other aspects and advantages will become more apparent after careful consideration is given to the following detailed description of the preferred exemplary embodiments thereof.

BRIEF DESCRIPTION OF THE ACCOMPANYING DRAWINGS

Reference will hereinafter be made to the accompanying drawings, wherein like reference numerals throughout the various FIGURES denote like structural elements, and wherein;

FIG. 1 is an enlarged cross-sectional view of a laminate sheet in accordance with the present invention; and FIG. 2 is a schematic diagram of a system that may be employed to laminate a clear coat layer to a substrate.

DETAILED DESCRIPTION OF THE INVENTION

As shown in accompanying FIG. 1, the laminate 10 in accordance with the present invention most preferably includes a thermoplastic substrate layer 12, a clear coat layer 14, and a tie layer 16 which adhesively laminates the substrate and clear coat layers 12, 14 one to the other. The laminate 10 is most preferably provided in sheet form of any desired width and may be employed in injection-molding and thermoforming operations (e.g., as disclosed in the above-cited U.S. '233 patent) so as to form a variety of composite components, such as automotive trim components. Most preferably, the substrate layer 12 is colored with a colorant (pigment) blended homogeneously therewith.

The substrate layer 12 may be formed from virtually any thermoplastic material that is capable of subsequent thermoforming (e.g., so as to allow thermoformed contours and shapes to be formed in the manufacture of automotive trim components). In especially preferred forms, the substrate layer is formed of a thermoplastic polyolefin (TPO). A variety of TPO materials are commercially available, such as E-3000 grade TPO available commercially from Solvay Engineered Polymers and PD 801 grade TPO available commercially from Equistar Chemicals, LP. The TPO may be "neat" (that is, provided without any additives therein) or, more preferably, may be blended with virtually any additive conventionally employed in engineered resins generally. Thus, the TPO materials that may be employed satisfactorily in the practice of the present invention may include one or more colorants, ultraviolet stabilizers, fillers, processing aids and the like as may be desired or necessary for particular end-use applications.

The clear coat layer 14 is transparent or at least substantially transparent to visible light. Thus, for example, the clear coat layer is most preferably at least 90% transparent to visible light, and typically at least 95% transparent to visible light. Thus, the purpose of the clear coat layer 14 is to provide a high gloss finish to the products made from the laminate 10 and to protect the substrate layer 12 (e.g., so as to provide a layer which is resistant to scratching, UV radiation, abrasions, marring, heat and weathering). Most preferably, the clear coat layer includes a fluorinated thermoplastic (e.g., a polyvinyl fluoride, PVF). One particularly preferred PVF that may be employed as a clear coat layer 14 in the laminates 10 of the present invention is TEDLAR® polyvinyl fluoride commercially available from E.I. duPont de Nemours, Inc. ("duPont") of Wilmington, Del. Most preferably, the clear coat layer employed in the present invention is the duPont TEDLAR® TTR 10 AH8 and TEDLAR® TTR 10 AM8 polyvinyl fluoride.

The thickness of the clear coat layer will typically be between about 0.1 mil to about 4.0 mils, and typically between about 0.5 mil to about 1.5 mils. An especially preferred thickness of the clear coat layer is about 1.0 mil. In this regard, it will be understood that the thickness of the clear coat layer 14 expressed immediately above is in the absence of any protective layer that may be provided by the supplier as a means to protect the clear coat during processing and/or to assist the lamination of the clear coat layer to the substrate layer 12.

When employing PVF as the clear coat layer, it is advantageous that a surface thereof be primed with a layer of a suitable adhesion promoting agent. For example, when PVF is employed as a clear coat material in accordance with the present invention, it is preferred that one surface layer of the PVF film be primed with a layer of an acrylic polymer functioning as the adhesion promoting agent.

The adhesive bond between the base and clear coat layers 12, 14, respectively, is enhanced by virtue of the tie layer 16. In this regard, the tie layer in accordance with the present invention most preferably includes an adhesive-enhancing effective amount of a linear or branched styrenic block copolymer which adhesively bonds the substrate and clear coat layers one to another. Most preferably, the tie layer is a block copolymer comprised of styrene units and lower olefinic (e.g., C2–C5) copolymeric units, such as ethylene-propylene units, ethylene-butylene-isoprene units and the like.

The preferred styrenic block copolymers will comprise at least about 10 wt. %, typically at least about 15 wt. %, and most preferably at least about 18 wt. % of styrene content. The styrene content of the preferred styrenic block copolymers will typically less than about 55 wt. %, usually less than about 45 wt. %, and most preferably less than about 40 wt. %. On the other hand, the polyolefinic blocks in the styrenic block copolymers employed in the present invention will comprise at least about 40 wt. %, typically at least about 50 wt. %, up to about 90 wt. %.

One preferred styrenic block copolymer that may be employed as the tie layer material in accordance with the present invention is commercially available from Kraton Polymers of Houston, Tex. as KRATON® GRP 6919. Such material is a triblock copolymer having styrenic block units interspersed with ethylene/butylene copolymeric block units with polyisoprene side chains. This preferred styrenic block copolymer is comprised of about 18 wt. % styrene blocks and about 46 wt. % ethylene-butylene blocks, with about 36 wt. % of polyisoprene side chains.

Another preferred linear styrenic block copolymer that may be employed as the tie layer material in accordance with the present invention is commercially available from Kraton Polymers of Houston, Tex. as KRATON® G-1701. Such material is a triblock copolymer having styrenic block units and ethylene/propylene copolymeric block units and will exhibit a melt index (condition G) of less than 1 gram/10 minutes. This preferred styrenic block copolymer is comprised of about 37 wt. % styrene blocks and about 63 wt. % ethylene-propylene copolymeric blocks.

Because the tie layer is interposed physically between the substrate layer 12, and the clear coat layer 14, it likewise will most preferably be substantially transparent to visible light. Thus, for example, the tie layer 16 will most preferably exhibit a transparency to visible light of at least about 75% or greater. In especially preferred embodiments of the invention, the tie layer 16 will be at least about 90% transparent to visible light. In addition, the tie layer 16 will be relatively thin as compared to the thickness of the substrate and/or clear coat layers 12, 14, respectively. In preferred embodiments, the thickness of the tie layer will be about 7.5 mil or less, more preferably about 5 mil or less, and most preferably about 3 mil or less.

A preformed multilayer sheet of the substrate layer 12 and the tie layer 16 may be provided by co-extruding the substrate layer material and the tie layer material through a sheet die of desired width according to well known coextrusion techniques. The coextruded substrate and tie layers 12, 16 may then be allowed to cool and taken up in roll form for subsequent lamination with the clear coat layer 14 which is itself most preferably provided in roll form. Alternatively, the coextruded substrate and tie layers 12, 16 may be cooled in line and laminated continuously with a clear coat layer.

The material forming the tie layer 16 may also be dissolved in suitable organic solvent and applied as a solution onto a surface of the substrate layer 12. Specifically, when employing styrenic block copolymers as described above for the tie layer 16, it is advantageous that the material be solvated in a suitable solvent, such as a mixture of toluene and an alcohol (e.g., isopropyl alcohol). The solution containing the styrenic block copolymer may then be applied onto the surface of the substrate 12 in any convenient manner, such as, by spraying, padding, roll-coating or the like. The solvent may then subsequently be allowed to evaporate under elevated temperature conditions so as to leave the tie layer 16 as a solid film residue on the substrate surface.

Advantageously, the tie layer includes a mixture or homogeneous blend of a styrenic copolymer and a tackifier. Most preferably, the tackifier is selected from terpene resins and derivatives thereof. Preferred terpene resins for use in the present invention are those commercially available from Arizona Chemical of Jacksonville, Fla. under the trademark SYLVARES™ resins. Most preferred is the modified terpene resin available commercially as SYLVARES™ ZT 105LT resin. If present, the tackifier will be employed in amounts between about 30 wt. % to about 70 wt. %, more preferably between about 40 wt. % and 60 wt. % based on the total weight of the styrenic block copolymer and the tackifier. In especially preferred embodiments, the tackifier and the styrenic block copolymer will each be employed in an amount of about 50 wt. % (i.e., a 50:50 blend).

Accompanying FIG. 2 depicts one exemplary technique for forming the laminate 10 in accordance with the present invention. In this regard, clear coat layer 14 may be unwound from its supply roll 14-1 and passed over guide roller 18. The substrate and tie layers 12, 16 (designated collectively as reference numeral 20 in FIG. 2, and see also the collective reference thereto in FIG. 1) may be unwound from its supply roll 20-1 and passed over guide roll 22 so that the tie layer 16 thereof is disposed physically between the substrate and clear coat layers 12, 14, respectively. The layers 14, 20 meet at the nip 25 between the opposed pair of laminating rolls 24, 26. The surfaces of the rolls 24, 26 may be optionally heated in any convenient manner. Most preferably, the surfaces of the rolls 24, 26 are heated to elevated temperatures of between about 220° F. to about 275° F. Moreover, the rolls 24, 26 are capable of exerting a force at the nip of between about 20 to about 350 pli (pounds per linear inch), more preferably between about 100 to about 300 pli, and most preferably about 120 pli. The elevated temperature and laminating force at the nip between the rolls 24, 26 thereby cause the substrate layer 12 to be bonded to the clear coat layer 14 via the tie layer 16 so as to form the laminate 10 which is fed away from the rolls 24, 26 and most preferably taken up in roll form.

The substrate layer 12 may be provided as a preformed sheet, in which case the tie layer 16 may be extruded as a melt or applied as a solution onto the preformed substrate layer sheet to achieve the desired thickness. Also, the tie layer 16 may be provided on the clear coat layer 14 which is thereafter brought into laminating contact with the substrate layer 12. It is also contemplated that the tie layer material may be extruded as a melt between preformed sheets of the substrate and clear coat layers 12, 14 just upstream of the nip between the rolls 24, 26 (i.e., if the laminate is produced in a continuous process) or just prior to lamination of individual sheets of layers 12, 14 if done in a batch-wise manner.

The present invention will be further understood by reference to the following non-limiting Examples.

EXAMPLES

Example 1

The following components were employed:

Thermoplastic Polyolefin (TPO): E-3000 commercially available from Solvay Engineered Polymers of Auburn Hills, Mich.

Polyvinyl Fluoride (PVF): TEDLAR® TR 10 AH8 or TR10 AM8 clear coat sheet commercially available from E.I. duPont de Nemours Inc. of Wilmington, Del.

KRATON® GRP 6919: A branched styrenic triblock copolymer commercially available from Kraton Polymers comprised of about 18 wt. % of styrene units in the polymer backbone, about 46 wt. % of ethylene-butylene copolymeric units in the polymer backbone, and about 36 wt. % of polyisoprene side chains or branches extending from the polymer backbone.

KRATON® G-1701: A linear styrenic triblock copolymer commercially available from Kraton Polymers comprised of about 37 wt. % of styrene units in the polymer backbone, and about 63 wt. % of ethylene-propylene copolymeric units in the polymer backbone.

SYLVARES™ ZT 105LT: A modified terpene resin commercially available from Arizona Chemical.

A 50:50 blend of styrenic block copolymer (KRATON® GRP 6919) and terpene resin (SYLVARES™ ZT 105LT) was prepared using a batch mixer at 150° C. The mixture was dissolved into a 90:10 v/v mixture of toluene and isopropyl alcohol. The resulting solution was spread onto a TPO extruded sheet (E-3000, Solvay Engineered Polymers) and the resulting surface was dried at 120° C. for five minutes using an air convection oven so as to evaporate the solvent and thereby leave the mixture of the styrenic block copolymer and terpene resin as a dried film residue thereon. The multilayer TPO/tie layer sheet was thereafter laminated to a clear coat sheet of polyvinyl fluoride (TEDLAR® PVF) to form a laminate comprised of TPO/tie layer/PVF by concurrently feeding the sheets to the nip region of a lamination roll.

The resulting laminated sheet was tested at room temperature (70° F.) for peel strength of the PVF layer using a universal testing machine according to ASTM D 1876-95. Adequate peel strengths of greater than about 3.0 pli were observed.

Example 2

Example 1 was repeated except that no solvent was employed. Instead, a 50:50 blend of the styrenic block copolymer and terpene resin was extruded as a melt in film form onto a surface of the TPO substrate, following which the PVF layer was laminated thereto. Comparable peel strengths to the solvent-applied tie layer of Example 1 were observed.

Example 3

Example 1 was repeated except that a linear styrenic block copolymer (KRATON® G-1701) was employed instead of the branched styrenic block copolymer. Comparable peel strengths to Example 1 were observed.

Example 4 (Comparative)

Example 1 was repeated except that no tie layer was interposed between the TPO and PVF layers. No adhesion between the TPO and PVF layers was observed as the layers were easily delaminated.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A laminate comprised of a thermoplastic polyolefin (TPO) substrate layer, a polyvinyl fluoride (PVF) clear coat layer, and a tie layer comprised of an adhesive-enhancing effective amount of a blend of a styrenic block copolymer and a tackifier which comprises a terpene resin, wherein said tie layer adhesively bonds said substrate and clear coat layers one to another.

2. The laminate of claim 1, wherein said styrenic block copolymer is branched.

3. The laminate of claim 1, wherein said styrenic block copolymer is linear.

4. The laminate of claim 1, wherein the terpene resin is present in an amount between about 30 wt. % to about 70 wt. % based on the total weight of the styrenic block copolymer and the tackifier.

5. The laminate of claim 1, wherein the terpene resin is present in an amount between about 40 wt. % and 60 wt. % based on the total weight of the styrenic block copolymer and the tackifier.

6. The laminate of claim 1, wherein each of the tackifier and the styrenic block copolymer is present in an amount of about 50 wt. %, based on the total weight of the styrenic block copolymer and tackifier.

7. The laminate of claim 1, wherein the substrate layer is colored.

8. The laminate of claim 7, wherein each of said clear coat and said tie layers is at least 95% transparent to visible light so that the color of the substrate is visible therethrough.

9. A shaped article which includes a laminate according to any one of claims 1–8.

10. The shaped article of claim 9, in the form of an automotive trim component.

* * * * *